United States Patent [19]

Chaboud et al.

[11] Patent Number: 5,315,599
[45] Date of Patent: May 24, 1994

[54] MICROPROCESSOR-BASED MONITORING OR PROTECTION DEVICE COMPRISING AN ANALOG DATA ACQUISITION SYSTEM

[75] Inventors: Gilbert Chaboud, Seyssinet; Yvan Kalenine, St. Ismier, both of France

[73] Assignee: Merlin Gerin, France

[21] Appl. No.: 772,858

[22] Filed: Oct. 8, 1991

[30] Foreign Application Priority Data

Oct. 23, 1990 [FR] France .................. 90 13217

[51] Int. Cl.⁵ .................. G01R 31/28; G06F 11/00
[52] U.S. Cl. .................. 371/25.1; 371/21.2
[58] Field of Search .................. 371/25.1, 21.2

[56] References Cited

U.S. PATENT DOCUMENTS

| | | | |
|---|---|---|---|
| 4,319,355 | 3/1982 | Mollier | 371/21.2 |
| 4,760,575 | 7/1988 | Watanabe | 371/21.2 |
| 4,974,226 | 11/1990 | Fujimori | 371/25.1 X |

FOREIGN PATENT DOCUMENTS

3149926 8/1982 Fed. Rep. of Germany .

OTHER PUBLICATIONS

Patent Abstracts of Japan, vol. 8, No. 139 (E-253)(1576), Jun. 28, 1984.
IBM Technical Disclosure Bulletin, vol. 30, No. 5, Nov. 1987.
IBM Technical Disclosure Bulletin, vol. 31, No. 8, Jan. 1989.

*Primary Examiner*—Robert W. Beausoliel, Jr.
*Assistant Examiner*—Glenn Snyder
*Attorney, Agent, or Firm*—Parkhurst, Wendel & Rossi

[57] ABSTRACT

A certain number of high bits of each sample (12 bits) supplied by an analog-to-digital converter is used as the address of a comparison zone of a RAM associated with the microprocessor of the device. In this comparison zone the result of comparison of this sample with a predetermined number of thresholds has previously been recorded. The sample (12 bits) and associated comparison result (4 bits) are stored in a storage zone of the RAM for subsequent processing by the microprocessor. This simultaneous acquisition of a sample and of the prerecorded result of comparison of this sample with the thresholds minimizes the time devoted by the microprocessor to data acquisition.

12 Claims, 2 Drawing Sheets

|      | 0000 | 0001 | 0010 | 0011 | 0100 | 0101 | 0110 | 0111 | 1000 | 1001 | 1010 | 1011 | 1100 | 1101 | 1110 | 1111 |
|------|------|------|------|------|------|------|------|------|------|------|------|------|------|------|------|------|
| 0000 | 0 | 0 | 0 | 0 | 0 | 0 | 0 | 0 | 0 | 0 | 0 | 0 | 0 | 0 | 0 | 0 |
| 0001 | 0 | 0 | 0 | 0 | 0 | 0 | 0 | 0 | 0 | 0 | 0 | 0 | 0 | 0 | 0 | 0 |
| 0010 | 0 | 0 | 0 | 0 | 0 | 0 | 0 | 0 | 0 | 0 | 0 | 0 | 0 | 0 | 0 | 0 |
| 0011 | 0 | 0 | 0 | 0 | 0 | 0 | 0 | 0 | 0 | 0 | 0 | 0 | 0 | 0 | 0 | 0 |
| 0100 | 0 | 0 | 0 | 0 | 0 | 0 | 0 | 0 | 0 | 0 | 0 | 0 | 0 | 0 | 0 | 0 |
| 0101 | 0 | 0 | 0 | 0 | 0 | 0 | 0 | 0 | 0 | 0 | 0 | 0 | 0 | 0 | 0 | 0 |
| 0110 | 0 | 0 | 1 | 1 | 1 | 1 | 1 | 1 | 1 | 1 | 1 | 1 | 1 | 1 | 1 | 1 |
| 0111 | 1 | 1 | 1 | 1 | 1 | 1 | 1 | 1 | 1 | 1 | 1 | 1 | 1 | 1 | 0 | 0 |
| 1000 | 0 | 0 | 0 | 0 | 0 | 0 | 0 | 0 | 0 | 0 | 0 | 0 | 0 | 0 | 0 | 0 |
| 1001 | 0 | 0 | 0 | 0 | 0 | 0 | 0 | 0 | 0 | 0 | 0 | 0 | 0 | 0 | 0 | 0 |
| 1010 | 0 | 0 | 0 | 0 | 0 | 0 | 0 | 0 | 0 | 0 | 0 | 0 | 0 | 0 | 0 | 0 |
| 1011 | 0 | 0 | 0 | 0 | 0 | 0 | 0 | 0 | 0 | 0 | 0 | 0 | 0 | 0 | 0 | 0 |
| 1100 | 0 | 0 | 0 | 0 | 0 | 0 | 0 | 0 | 0 | 0 | 0 | 0 | 0 | 0 | 0 | 0 |
| 1101 | 0 | 0 | 0 | 0 | 0 | 0 | 0 | 0 | 0 | 0 | 0 | 0 | 0 | 0 | 0 | 0 |
| 1110 | 0 | 0 | 1 | 1 | 1 | 1 | 1 | 1 | 1 | 1 | 1 | 1 | 1 | 1 | 1 | 1 |
| 1111 | 1 | 1 | 1 | 1 | 1 | 1 | 1 | 1 | 1 | 1 | 1 | 1 | 1 | 1 | 0 | 0 |

*FIG. 2*

MICROPROCESSOR-BASED MONITORING OR PROTECTION DEVICE COMPRISING AN ANALOG DATA ACQUISITION SYSTEM

BACKGROUND OF THE INVENTION

The invention relates to a monitoring or protection device comprising a microprocessor, a RAM, an analog-to-digital converter, to whose input analog signals are applied and designed to supply to the microprocessor digital samples representative of the analog input signals, and means for comparing each digital sample with a predetermined number of predetermined thresholds.

In state-of-the art systems, comparison of each sample to a certain number of thresholds is performed by the micro-processor, in a suitably programmed comparison sequence. Each sample supplied by the analog-to-digital converter is read by the microprocessor and may be stored in the RAM. The micro-processor then searches in an appropriate zone of the RAM for the thresholds to which the sample is to be compared and successively performs comparison of the sample with each of these thresholds. The result of this comparison can then be stored and used for subsequent processing purposes. In monitoring or protection devices, notably in built-in medium voltage cubicle protection and monitoring devices, each sample has to be compared to a large number of thresholds, whether they be thresholds intrinsic to the acquisition proper, such as non-saturation checks of physical quantity sample measurements, or thresholds connected with the protective functions to be performed, such as detection of maximum current, voltage, etc. These threshold tests are numerous, systematic and repetitive, and the processing time required for the microprocessor CPU to perform these comparisons increases as the number and complexity of the threshold zones increase.

SUMMARY OF THE INVENTION

The object of the present invention is to achieve a device wherein the comparisons are performed very quickly, on acquisition of a sample, while avoiding having the micro-processor CPU operate for this purpose, the latter, released from these repetitive tasks, remaining free to perform other tasks.

This object is achieved by the fact that said comparison means are formed by a first, comparison, zone of the RAM, the RAM comprising an address bus connected to the output of the analog-to-digital converter, in such a way that a predetermined number of high bits of a sample constitutes the address of a predetermined number of memory locations of the comparison zone in which the results of comparison to said thresholds of the samples whose high bits have a predetermined value are previously stored, in binary form, said comparison results and the corresponding sample being stored in a second, storage, zone of the RAM.

The RAM, normally associated with the microprocessor, therefore acts as comparator and enables a sample and the result of comparing this sample with several predetermined thresholds to be stored simultaneously, for subsequent processing by the microprocessor. Comparison of a sample with these thresholds is therefore performed automatically and quickly on acquisition of a sample, before any data processing by the microprocessor. The saving on microprocessor processing time very easily outweighs the increased memory capacity required. This also enables the much more costly use of specific circuits for purely hardware comparison to be avoided.

According to a development of the invention, the device comprises a first buffer memory whose input is connected to the output of the analog-to-digital converter, a second buffer memory whose input is connected to the output of the comparison zone of the RAM, the outputs of the first and second buffer memories being connected to the microprocessor data bus, itself connected to the RAM data bus, so that the data, samples and results of comparison of this sample with said thresholds, contained in said buffer memories, can be read and stored in the storage zone of the RAM.

The first buffer memory accessible in parts, preferably comprises first and second parts, reading of the data contained in the buffer memories being performed in two successive cycles, a first cycle consisting in reading the content of the first part of the first buffer memory and a second cycle consisting in simultaneously reading the content of the second part of the first buffer memory and the content of the second buffer memory.

The device preferably receives data from several channels. This data is multiplexed before being applied to the analog-to-digital converter and the thresholds to which a sample is to be compared can be very different depending on the type of data supplied by a channel, for example the thresholds are not the same depending on whether signals representative of the phase current, voltage, ground current, or temperature, are involved.

According to a development of the invention, the device comprises multiplexing means whose output is connected to the input of the analog-to-digital converter, and whose inputs are connected to a plurality of channels, means for selecting the channel whose analog signals have to be converted, a part of the comparison zone of the RAM being assigned to each of said channels, or to a predetermined group of channels, the RAM address bus being connected to the output of said means for selecting the channel, so as to select in the RAM said part of the comparison zone corresponding to the channel with which the converted sample is associated.

The comparison thresholds can thus be adapted independently to the different data acquisition channels.

BRIEF DESCRIPTION OF THE DRAWINGS

Other advantages and features will become more clearly apparent from the following description of an illustrative embodiment of the invention, given as a non-restrictive example only and represented in the accompanying drawings, in which:

FIG. 2 represents an example of a part, associated with a channel, of the comparison zone of the RAM of the device according to FIG. 1.

DESCRIPTION OF THE PREFERRED EMBODIMENT

Figure 1:
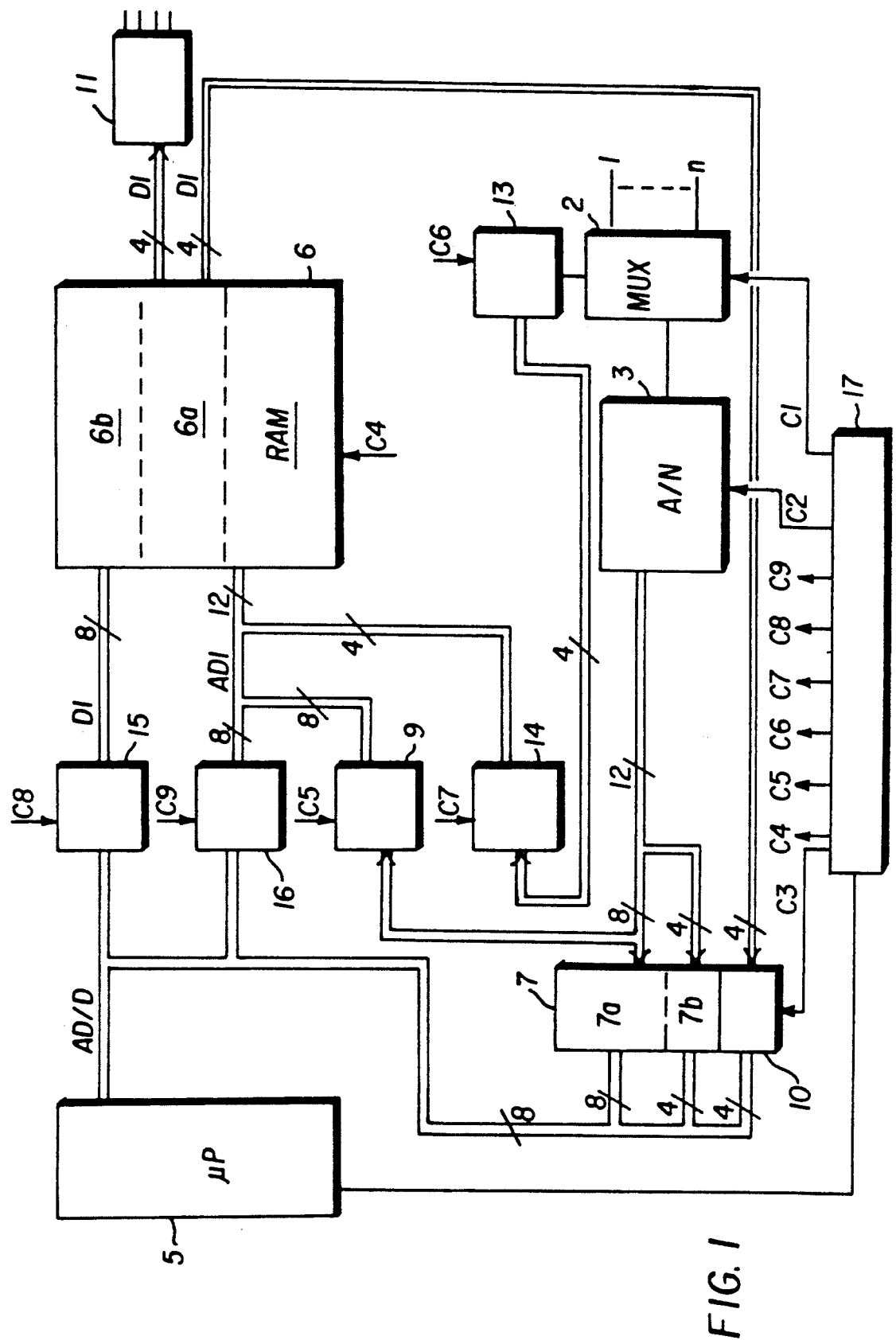
FIG. 1 represents, in simplified block diagram form, a device according the invention.

In the particular embodiment of the invention represented in FIG. 1, analog signals, from several channels, 1 to n, are applied to the input of a multiplexer 2. The output of the multiplexer is connected to the input of an analog-to-digital converter 3. The device also comprises a microprocessor 5, associated with a standard RAM 6.

In FIG. 1, the converter 3 is a 12-bit converter supplying a 12-bit sample on its output bus. This output bus is connected to the input of a first buffer memory, or register 7, designed to temporarily store a sample at the end of conversion of the analog signals supplied to the converter by a predetermined channel. The output of the first buffer memory 7 is connected to the microprocessor 5 by an 8-bit address and data bus AD/D.

Acquisition of a sample by the microprocessor is performed in two successive cycles, a first cycle to read 8 bits stored in a first part 7a of the first buffer memory 7, and a second cycle to read the remaining 4 bits stored in a second part 7b of the first buffer memory.

A first zone 6a of the RAM, organized as a comparison zone, is addressed by the 8 high bits of a sample during the read cycle by the microprocessor of the 8 bits stored in the first part 7a of the first buffer memory 7. The address bus AD1 of the RAM 6 is, for this, connected via a storage flip-flop 9 in FIG. 1, to the output bus of the converter 3.

The comparison zone 6a in FIG. 1 comprises 256 bytes, i.e. 8 memory locations (one byte) capable of being addressed by each of the possible combinations of the 8 address bits.

An output bus of the comparison zone 6a is connected to the input of a second buffer memory, or register 10, to which 4 bits are transferred, for example the 4 low bits, of the memory locations addressed by the sample involved.

These 4-bits represent the result, previously stored in zone 6a, of the comparison of the samples whose high bits are associated with the same address of zone 6a with four sets of thresholds. This comparison result associated with a sample, stored in the second buffer memory 10, is read by the microprocessor during the second read cycle at the same time as the 4 bits of the sample stored in the second part 7b of the first buffer memory 7.

In the preferred embodiment represented in FIG. 1, each byte of the comparison zone 6a of the RAM comprises 4 additional bits which enable the samples to be compared to other thresholds, these 4 bits being applied via a bus to the input of an alarm and/or signalling circuit 11.

A channel selection circuit 13 monitors the multiplexer 2. If the signals applied to the different channels have to be compared to different thresholds, which is generally the case, the RAM 6 comprises a part of the comparison zone 6a associated with each of the channels, or possibly with a group of channels. To give an example, all the channels on which current values are measured can correspond to one part of the zone. In order to determine which part of the zone 6a is associated with the sample which has just been converted, the number of the converted channel is stored in a storage flip-flop 14 whose input is connected to the channel selection circuit 13. The output of the storage flip-flop 14 is connected to the address bus AD1 of the RAM 6 so as to enable the part of the zone 6a associated with the channel involved to be addressed. If the number n of channels is 16, 4 bits are required to code the channel number, and the address of the locations of the RAM 6 corresponding to a given sample is formed by the 4 channel number bits and the 8 high bits of the sample.

In FIG. 1, circuits 15 and 16 enable the microprocessor address and data bus AD/D to be isolated respectively from the data bus D1 and address bus AD1 of the RAM 6.

A monitoring circuit 17 performs synchronization of the various circuit components. It is connected to the microprocessor and supplies control signals C1 to C9 respectively to the multiplexer 2, converter 3, buffer memories 7 and 10, RAM 6, storage flip-flop 9, channel selection circuit 13, storage flip-flop 14, isolating circuit 15 and circuit 16.

The device according to FIG. 1 operates as follows:

In a first stage, the analog-to-digital converter converts the analog signals, present on the channel selected by the selection circuit 13, which are presented to it by the multiplexer 2.

The end of conversion initializes a second stage consisting in storing the 12 bits of the converted sample in the first buffer memory 7, the 8 high bits of this sample in the storage flip-flop 9, and the 4 bits of the corresponding channel number in the storage flip-flop 14.

During a third stage corresponding to a first read cycle, the content of the first part 7a of the first buffer memory 7 is applied to the address and data bus AD/D of the microprocessor so as to be read. At the same time, the content of the storage flip-flops 9 and 14 is applied to the address bus AD1 of the RAM 6, the 4 bits of the flip-flop 14, representative of the channel number involved, enabling the part of the memory zone 6a corresponding to this channel to be identified, and the 8 bits of the flip-flop 9, representative of the high bits of the sample involved, identifying the corresponding memory locations within this part of the zone. The result of comparison of the sample with predetermined thresholds is stored, in the form of 4 bits, in the second buffer memory 10. The result of comparison with additional thresholds can be applied to the input of the alarm and signalling circuit 11. It can also be used if required to perform a hardware microprocessor interrupt. In the case of a medium voltage relay, it can for example call a particular procedure demanding immediate processing thus interrupting the background tasks when a sample representative of the current exceeds a predetermined critical value.

During the first three stages, the circuits 15 and 16 isolate the microprocessor address and data bus AD/D from the RAM data bus D1 and address bus AD1.

In a fourth stage, the 8 bits of the sample which have just been read are stored in a second, storage, zone 6b of the RAM 6. The corresponding data is transmitted to the RAM 6 by the microprocessor address and data bus AD/D, circuit 15, and memory data bus D1, to an address transmitted to it by the bus AD/D, circuit 16 and RAM address bus AD1. During this stage, the flip-flops 9 and 14 are off.

The fifth stage comprises a second read cycle. The buses AD/D, D1 and AD1 are again isolated by the circuits 15 and 16. The content of the second part 7b of the first buffer memory 7 and the content of the second buffer memory 10 are applied to the bus AD/D in order to be read. At the end of this stage, the whole sample and result of comparison with predetermined thresholds have therefore been read, in two read cycles.

In a sixth and last stage, of the same type as the fourth, the last 4 bits of the sample and the 4 bits of the result of comparison with thresholds associated with the sample, which have just been read, are stored in the second, storage, zone 6b of the RAM 6.

Each sample is therefore associated, in the storage zone 6b of the RAM, with the result of its comparison with predetermined thresholds and the microprocessor will be able to use this data directly for any subsequent processing, without having to perform repetitive comparisons on each of the samples to be processed.

At a suitable moment, either at the end of the second stage or during the third stage, the channel selection circuit 13 will modify the selected channel number and apply the new channel number to be selected to the multiplexer. As soon as possible after the end of conversion of a sample associated with a channel, the multiplexer will thus present to the converter the analog signals present on the next channel to be converted, which enables the signals to be stabilized at the converter input before the beginning of the next conversion.

Although in the embodiment represented the microprocessor operates during the data read cycles and when it is written in the RAM storage zone, the microprocessor data acquisition time can be further reduced by using, in state-of-the-art manner, a direct memory access (DMA) channel.

FIG. 2 illustrates in greater detail an example of a part of the RAM comparison zone 6a, associated with a channel. In FIG. 2, only one of the memory locations associated with each of the addresses of the part of the comparison zone, associated with a channel, is represented, with one bit per address corresponding to the result of comparison with a predetermined set of thresholds of samples whose high bits correspond to this address.

A part of the zone 6a, addressed by 8 bits, comprises 256 bytes, only one bit of which is represented in FIG. 2.

The 8 address bits are broken down into two times 4 bits, the four highest bits addressing the 16 horizontal rows, and the remaining four bits addressing the 16 vertical columns. The highest bit is a sign bit, 0 corresponding to the (+) sign and 1 to the (−) sign.

A zone has been delimited in FIG. 2 in which:

$$1572 \leq |E| \leq 2020$$

E being the value of a sample and the FIGURES being represented in binary, i.e.:

|       |      |      |      |
|-------|------|------|------|
| +1572 | 0110 | 0010 | 0000 |
| −1572 | 1110 | 0010 | 0000 |
| +2020 | 0111 | 1110 | 0000 |
| −2020 | 1110 | 1110 | 0000 |

The result of the comparison between the absolute value of a sample E and the above-mentioned limits is indicated in the FIGURE by a 1 if this absolute value is comprised within these limits, and by a zero if this absolute value is outside these limits.

To give an example, the result obtained with a sample of value +1990 has been indicated in FIG. 2. In binary, we obtain

|       |      |      |      |
|-------|------|------|------|
| +1990 | 0111 | 1100 | 0010 |

As only the 8 high bits are used as address, the corresponding location is indicated by a cross in the FIGURE and we obtain, by simple addressing, the result, 1 in the present case, of the comparison of this sample with a predetermined set of thresholds.

It is clearly apparent from this example that each sample can be compared very quickly either to a given threshold or to a set of thresholds defining a zone which may be complex.

The use of several memory bits among the byte addressed enables each sample to be compared just as quickly to several sets of thresholds which may be very complex.

To give an example, 8 sets of comparisons (1 byte per address) on 16 analog acquisition channels enable 128 comparisons to be made with independent sets of thresholds. In addition, these thresholds can be modified at any time by simple modification of the content of the corresponding zone 6a of the RAM.

The device described above has enabled a medium voltage relay monitoring and protection device to be achieved wherein the percentage of time devoted by the microprocessor CPU to data acquisition has been reduced from 25% in a conventional device to 3%, with the same sampling period.

The accuracy of the comparisons depends on the number of bits of the sample used to address the RAM zone 6a. In the case of a 12-bit sample, if all the bits are used, the accuracy is maximum, but the memory capacity required for comparison corresponds to 4K bytes per channel. If the number of high bits of the sample used for addressing zone 6a is decreased, the memory capacity required decreases but the accuracy of the comparisons also decreases. The preferred embodiment described above, with 8 addressing bits, also enables a satisfactory compromise to be achieved between accuracy of comparisons and memory capacity required (256 bytes per channel).

We claim:

1. A monitoring or protection device comprising:
    a microprocessor, a RAM, an analog-to-digital converter for receiving analog input signals and supplying digital samples representative of the analog input signals to the microprocessor, and comparison means for comparing each digital sample with a predetermined number of predetermined thresholds,
   wherein said comparison means includes a first, comparison, zone of the RAM, wherein the RAM is connected to an output of the analog-to-digital converter by an address bus in such a way, that a predetermined number of high bits of a sample constitutes the address of a predetermined number of memory locations of the comparison zone, in which the results of comparison to said thresholds of the samples whose high bits have a predetermined value are previously stored, in binary form, and wherein said comparison results and the corresponding sample are stored in a second, storage, zone of the RAM.

2. The device according to claim 1, further comprising a first buffer memory whose input is connected to the output of the analog-to-digital converter, and a second buffer memory whose input is connected to an output of the comparison zone of the RAM, wherein outputs of the first and second buffer memories are connected to a microprocessor data bus, itself connected to a RAM data bus, so that the data, samples and results of comparison of this sample with said thresholds, contained in said buffer memories, can be read and stored in the storage zone of the RAM.

3. The device according to claim 2, wherein the first buffer memory comprises first and second parts, reading of the data contained in the buffer memories being performed in two successive cycles, a first cycle consisting of reading the content of the first part of the first buffer memory and a second cycle consisting of simultaneously reading the content of the second part of the first buffer memory and the content of the second buffer memory.

4. The device according to claim 1, wherein the converter is a 12-bit converter, the 8 high bits of a sample constituting the address of the locations of the comparison zone of the RAM associated with said sample.

5. The device according to claim 1, wherein the comparison zone of the RAM comprises four memory locations associated with each address.

6. The device according to claim 1, further comprising multiplexing means whose output is connected to and input of the analog-to-digital converter, and whose inputs are connected to a plurality of channels, means for selecting the channel whose analog signals have to be converted, a part of the comparison zone of the RAM being assigned to each of said channels, or to a predetermined group of channels, the RAM address bus being connected to an output of said means for selecting the channel, so as to select in the RAM said part of the comparison zone corresponding to the channel with which the converted sample is associated.

7. The device according to claim 6, wherein said plurality of channels comprise 16 channels, and the means for selecting the channels supplying to the RAM address bus includes four bits representative of the channel associated with the converted sample.

8. The device according to claim 1, wherein the comparison zone of the RAM comprises a predetermined number of additional memory locations associated with each address, in which the results of comparison of additional thresholds and samples whose high bits have a predetermined value are previously stored, in binary form, and wherein the content of said additional memory locations are applied to an input of an alarm and/or signalling circuit.

9. The device according to claim 8, wherein said comparison zone of the RAM comprises 4 additional memory locations associated with each address.

10. An apparatus comprising;
an analog-to-digital converter for converting analog input signals into digital samples representative of the analog input signals, wherein the digital samples includes a plurality of high bits and low bits;
a random access memory unit including a comparison zone and a storage zone, wherein the comparison zone contains a plurality of storage locations containing comparison result data corresponding to a comparison of the digital samples with a plurality of predetermined thresholds;
first bus means for applying the high bits of the digital samples to the random access memory unit to address the storage locations in the comparison zone, wherein the comparison data is then supplied to a data output of the random access memory unit;
a first buffer memory coupled to an output of the analog-to-digital converter, wherein the first buffer memory includes a first storage part that receives the high bits of the digital samples and a second storage part that receives the low bits of the digital samples;
a second buffer memory coupled to the data output of the random access memory unit to receive the comparison results data;
second bus means for addressing the storage zone of the random access memory and transferring the high bits of the digital samples from the first part of the first buffer memory to the storage zone during a first read cycle, and for transferring the low bits of the digital samples from the second part of the first buffer memory and the comparison result data from the second buffer memory to the storage zone during a second read cycle;
a microprocessor coupled to an output of the first buffer memory and the second buffer memory, wherein the microprocessor reads the high bits of the digital samples from the first part of the first buffer memory during the first read cycle, and the low bits of the digital samples from the second part of the first buffer memory and the comparison result data from the second buffer memory during the second read cycle; and
a monitoring circuit for synchronizing the operation of the analog-to-digital converter, the random access memory unit, the first and second bus means, the first and second buffer memories and the microprocessor.

11. An apparatus as claimed in claim 10, further comprising: multiplexing means for selectively connecting an input of the analog-to-digital converter to a selected channel of a plurality of input data channels.

12. An apparatus as claimed in claim 10, wherein the comparison zone of the random access memory unit is divided into sections corresponding to the plurality of input data channels, and wherein the first bus means includes means for applying data bits representative of the selected channel to the random access memory unit to address the section of the comparison zone corresponding to the selected channel.

* * * * *